Aug. 13, 1957 J. E. BROOK 2,802,976
POSITION SERVO
Filed Nov. 1, 1954
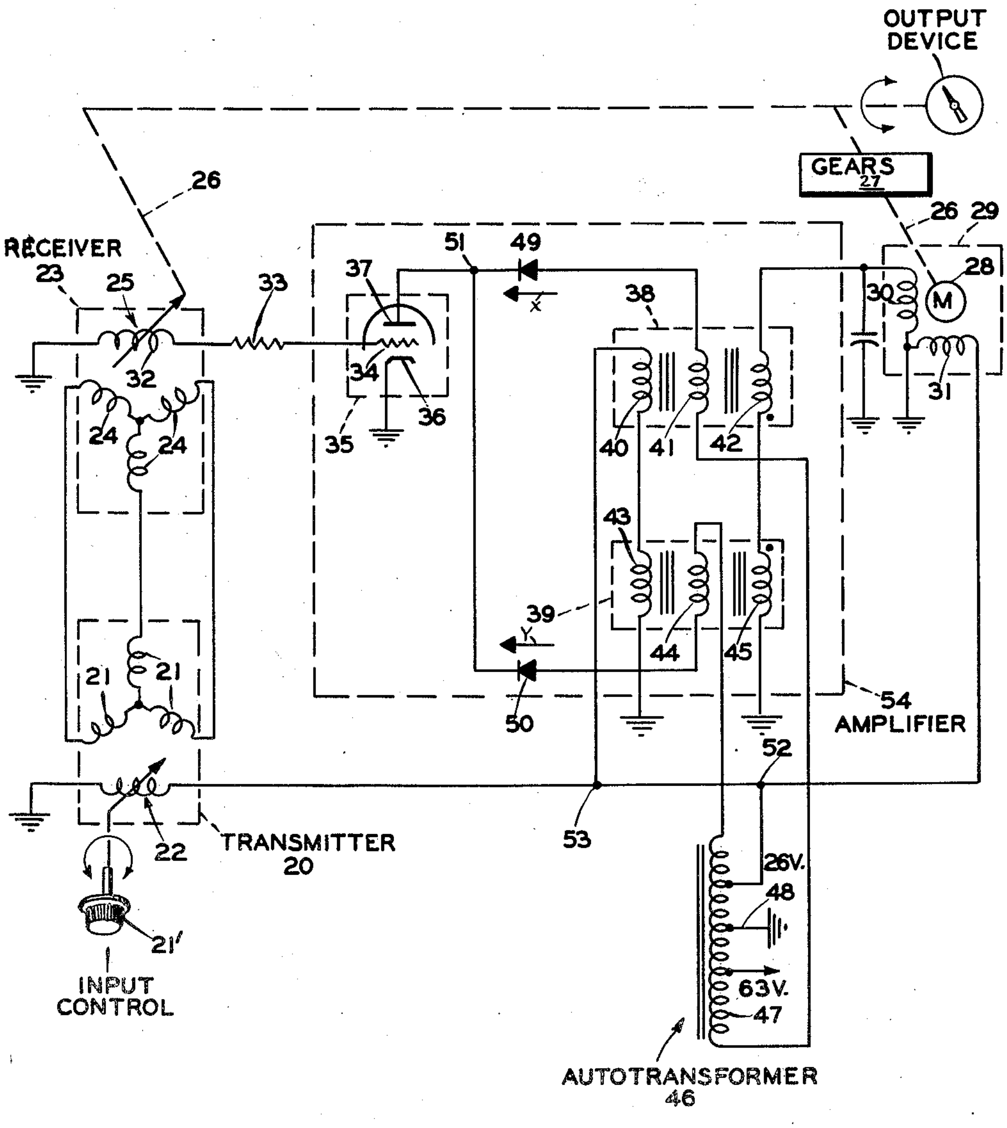
INVENTOR.
JAMES E. BROOK
BY Herbert Smith
ATTORNEY 2,802,976

POSITION SERVO

James E. Brook, Hackensack, N. J., assignor to Bendix Aviation Corporation, Teterboro, N. J., a corporation of Delaware Application November 1, 1954, Serial No. 465,778

13 Claims. (Cl. 318—30)

This invention relates to a position servo system and more particularly to means for minimizing the null drift in a balanced magnetic amplifier employed in position servo apparatus.

Heretofore, the amplifier portion of a position servo frequently employed balanced magnetic amplifiers with the control windings of a pair of saturable reactor elements each having a separate current control means, such as electron tubes. Since the magnetic amplifier utilizing the aforementioned arrangement is a balance device, a difference in quiescent current between any pair of current control means, such as triodes, taken at random, or a difference in quiescent current between a pair of matched current control means, due to aging, represents a shift or drift in the null when employed in a position servo.

It is an object of the present invention to provide a novel position servo having an amplifier including a single current control means connected to the balance windings of a magnetic amplifier portion thereof to minimize the null drift.

A further object of the invention is to provide a novel amplifier usable in a position servo, said amplifier having a single current control means connected to multiple control windings of a magnetic amplifier for minimizing the null drift.

Another object of the invention is to provide a novel amplifier usuable in a position servo wherein a single impedance current control means is connected to the balanced control windings of a pair of saturable reactor elements via rectifier switching means to minimize the null drift.

A further object is the provision of a novel power amplifier using multiple saturable reactor elements having control windings fed from a single impedance current control means.

A further object of the invention is to provide a power amplifier having a magnetic amplifier portion with identical control windings fed by a unitary current control means via switching means for reducing the error or null drift, said switching means being elements such as a dual diode, dry disc rectifier or other means that discriminate in direction of greatest conductivity for current flow.

A further object of the invention is to provide an amplifier employing saturable reactor elements having control windings connected in balanced arrangement fed from current discriminating switching means, which switching means is in turn fed from a current control means having a single output terminal, to the end that the control windings each time share the output of said current control means.

A further object of the invention is to provide a novel amplifier employing balanced loads connected to time share the impedance of a single current control means, which amplifier utilizes a minimum of parts, is efficient, reliable, and robust.

The invention conterplates an amplifier usable in a position servo, which amplifier has two load devices, such as saturable reactor elements, each having an excitation, a control, and an output winding. Each of the control windings are fed independently from one of the plates of rectifier switching means, with a current control means, such as a triode, having its output connected to a mid point of the rectifier switching means so that both of said control windings sequentially time-share the output of the pre-amplifier triode or current control means, i. e. a controlled impedance.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and not to be construed as defining the limits of the invention.

The single figure of the drawing shows a position servo employing an amplifier utilizing saturable reactor elements fed by a single output current control means.

Referring to the drawing, there is shown a schematic diagram of a position servo having a transmitter inductive device 20 having stator windings 21 and a rotor 22, with said rotor being coupled to an input control, such as a knob 21', for angularly positioning the rotor 22 relative to the stator windings. A receiver inductive device 23 has its stator windings 24 connected to the stator windings 21 of the transmitter in a conventional manner. The rotor 25 of the receiver inductive device has its shaft 26 coupled through a gear train 27 to the armature 28 of a reversible motor 29 having variable phase winding 30 and fixed phase windings 31. The shaft 26 through gear train 27 also actuates an output device, such as an indicator, as the motor drives the receiver to null. The rotor winding 32 of the receiver has one end connected to ground, as shown by conventional symbol, with the other end, connected via a resistor 33, to the grid 34 of the current control means 35.

In the present invention the present control means is a triode which also has a cathode 36 and a plate 37. While the current control means is shown as a triode, it may be a tetrode, a pentode, a magnetic amplifier, transistor, or any other device which provides a single impedance, which impedance may be time shared between the control windings of the saturable reactor or other load devices.

The current control means in the present showing is also used as a pre-amplifier for the magnetic amplifier portion of the amplifier of the position servo.

A pair of saturable reactor elements having cores 38 and 39 respectively, indicated generally by outlined blocks, each have three windings thereon. The saturable reactor element having core 38 has an excitation winding 40, a control winding 41, and an output winding 42. Saturable reactor element having core 39 also has similar windings, namely, an excitation winding 43, a control winding 44, and an output winding 45.

A source of excitation 46 provides an alternating current of pre-determined frequency. In the present invention a 400-cycle frequency source is supplied to the autotransformer winding 47. The mid-tap 48 of the autotransformer winding is connected to ground with opposite ends of said winding being connected respectively to one side of each of the control windings 41 and 44. The opposite side of control winding 41 is connected to the plate of a rectifier 49, while the opposite side of control winding 44 is connected to the plate of a rectifier 50. The cathodes of rectifiers 49 and 50 have a common terminal 51 which is connected to the plate 37 of the current control means 35. It is to be understood that while the rectifiers 49 and 50 are symbolically represented as being rectifiers of the dry type which have their greatest conductivity in the direction shown by arrows X and Y, these rectifiers may be replaced by other switching means, such as a dual diode with the cathode and plate elements of the dual diode connected in a manner similar to that shown in the drawing, or other equivalent switching means.

The output windings 42 and 45 of the saturable reactor elements with cores 38 and 39, respectively, are connected in series opposition as indicated by the conventional dot system. One end of said power windings is connected to ground, while the opposite end thereof is connected to one end of the variable phase winding 30 of the reversible motor 29. The opposite end of said variable phase winding is connected to ground. The fixed phase winding 31 of the reversible motor 29 has one end thereof also connected to ground with the other end thereof connected to terminal 52 of the autotransformer winding 47 for exciting said fixed phase with the 400 cycle alternating current frequency.

The winding of rotor 22 of the transmitter 20 has one end thereof connected to ground, with the other end thereof being connected to the source of excitation via terminal 52.

Excitation windings 40 and 43 are connected in series with one end thereof being connected to ground, while the other end of said series connection is terminated at terminal 53, which is common to the terminal 52 for providing 400 cycle excitation to said excitation windings of the magnetic amplifier portion of the amplifier.

The amplifier includes two identical saturable reactor elements having series connected excitation windings and series connected output windings wound on the outside legs of an E–I type lamination stack, or core. The control winding of each saturable reactor element is wound on the center leg of the core. Since the output windings are connected in series opposition, the net output is zero when each saturable reactor element is operating at the same point on the B–H curve of the core. Currents in the control windings establish the operating points of the cores in each saturable reactor element, whereby an unbalance in control winding currents will unbalance the individual output winding voltages and thereby produce a net output voltage for operating the motor which drives the receiver to positional agreement with the transmitter.

The present invention is concerned with a means for obtaining the control winding currents. The specific functioning of the particular magnetic amplifier proper is well known, and therefore is incidental, as other magnetic amplifiers may be utilized and may vary in detail depending on the particular design of the saturable reactor elements. Each control winding is supplied with equal and oppositely phased voltage at carrier frequency from a center tapped excitation transformer. The currents of each control winding pass through diode switches, such as rectifiers, having a common cathode. Both control winding currents return to ground through a common current control element, which is shown as a triode demodulator.

Due to the split phasing of the excitation voltages and the switching action of the diodes, the current control element operates alternately in time on each control winding, whereby the current control element is time shared between the two control windings. The control signal is a voltage at the carrier frequency that is in phase with or of opposite phase to the excitation voltage. The presence of a control signal will result in an increase in average current through one control winding and an equal decrease in current through the other control winding, thereby rotating the motor rotor in one direction or the other. When no control signal exists, the quiescent currents in each control winding will be equal and the rotor of the motor will be at rest.

Variations in the current flow through the current control element cannot unbalance the currents in the control windings, which unbalance would thereby produce a spurious output voltage when the input is grounded. Deteriorization of the current control element over long periods of time may shift the value of the quiescent current, but this will not appreciably affect the operation of the magnetic amplifier portion of the invention since any variation in current through the current control element will be reflected equally in each control winding and would not cause motor rotation. Consequently, the present invention minimizes or eliminates shift or drift in the null.

Operation of the input device or control by angularly displacing knob 21 will produce an error signal in the winding of rotor 32 which error signal is impressed on grid 34 of the current control device. The output of amplifier 54 will cause the armature 28 to rotate in a direction depending upon the phase of the error signal impressed on the grid 34. Rotation of the armature 28 operating through the gear train 27 will cause angular rotation of the shaft 26 in the proper direction, thereby rotating the receiver rotor 32 until it is in positional agreement with the rotor 22 of the transmitter, and also actuate the indicator or other device accordingly.

With the present invention, the current control element having a single impedance which is time-shared between the control windings of both saturable reactor elements minimizes the null drift which would be inherent to some degree in a device employing dual current control means, such as formerly were employed by the use of two independent preamplifiers each of which feed one of the control windings of a pair of saturable reactor elements.

Slow deterioration of the single diode results only in a slight change of amplifier gain, whereas with two triodes as was formerly used, the effect of deteriorization resulted in gain change as well as a spurious output signal to the reversible phase motor. The current differential between the two control windings of the present invention is independent of the current control tube.

The pair of rectifiers, as shown in the drawing, are connected symmetrically to the current control means 35 and the control windings 41, 44 and act as switches which sequentially place each control winding in the output circuit of the current control means 50 percentum of the time. Because the current in each control winding is determined by a single current control means, the current differential of the control windings is independent of the current control means.

While the invention shows the triode connected to the two rectifiers as a discriminator, it is to be understood that the discriminator may be used with the two windings of a torque motor in lieu of a magnetic amplifier. A conventional form of torque motor has a pair of torque motor windings controlled, in most instances, by a pair of pentodes. Torque motors of this kind which may employ the discriminator portion of this invention, usually have two coils of the armature energized by a differential current which causes the output shaft of the motor to be angularly displaced accordingly.

The circuit, in part, constitutes a phase discriminator and is therefore responsive only to the in phase component of the control signal. Any quadrature component of the control signal is rejected, that is, it will not produce a difference in the current flowing in the two load impedances, such as the two windings of a torque motor or the control windings of a magnetic amplifier.

The control winding quiescent currents are equal at a no signal condition, it being understood that these currents are produced by the excitation voltages. When a signal is applied to the control grid of the single impedance current control means, the currents in the control windings are unbalanced symmetrically, that is, the current in one control winding increases equally as the current in the other control winding decreases depending on the amplitude of the in phase component of the signal.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In an amplifier having a magnetic amplifier portion including a pair of saturable reactor elements each with a core of magnetizable material having excitation, control and output windings thereon, switching means, said control windingss being connected in a balanced arrangement with said switching means, and single impedance current control means connected to an electrical mid-point of said switching means, whereby said single impedance current control means is time shared between the control windings of each of said saturable reactor elements.

2. In an amplifier including saturable reactor elements with cores of magnetizable material having excitation, control and output windings thereon, discrete switching means, said control windings being connected in a balanced arrangement with said switching means and having a common terminal, and single impedance current control means connected to said common terminal, whereby said single impedance current control means is time shared between certain of said control windings so that the quiescent currents in said control windings will be equal when the excitation windings are energized by an alternating current.

3. An amplifier connectable to a source of excitation including saturable reator elements with cores of magnetizable material having excitation, control and output windings thereon, switching means, said control windings being connected in a balanced arrangement with said switching means and having a common terminal, and a single impedance current control means connected to said common terminal, said single empedance current control means being time shared between certain of said control windings, whereby upon excitation and at a no signal condition, the quiescent currents in said control windings will be equal.

4. An amplifier as set forth in claim 3 used in a position servo having transmitter and receiver inductive devices electrically connected to a reversible motor by way of said amplifier for energizing said motor to mechanically restore said receiver to null position, and wherein upon actuation of said transmitter and at a signal condition said amplifier will drive said motor to restore said receiver to a null position with a minimum or drift.

5. In a position servo employing inductive transmitting and receiving devices and including a magnetic amplifier having saturable reactor elements with cores each having thereon excitation, control and output windings operatively connected in a balanced arrangement, switching means connected to said control windings and having a common terminal, and a single impedance current control means connected to said switching means by way of said common terminal to provide energization of certain of said control windings fifty percentum of the time, whereby the quiescent currents in said control windings will be equal upon energization of said excitation windings to minimize the null drift of said position servo.

6. A position servo as set forth in claim 5 wherein said switching means are rectifiers.

7. A position servo as set forth in claim 5 wherein said single impedance current control means is a unitary electron tube.

8. Apparatus as set forth in claim 5 wherein said switching means are rectifiers and said single impedance current control means is a triode.

9. A compass system having a transmitter inductive device excited by a source of alternating current of predetermined frequency for generating a resultant signal voltage, a receiver inductive device for receiving said resultant signal and responsive to displacement therefrom for developing a corresponding signal, amplifier means electrically connected to said receiver for amplifying said last named signal, a motor, an indicator, said amplifier output operating said motor to actuate said indicator and drive said receiver to null position, said amplifier including saturable reactor elements with cores of magnetizable material having excitation, control and output windings thereon, switching means, said control windings being connected in a balanced arrangement with said switching means and having a common terminal, and single impedance current control means connected to said common terminal, whereby said single impedance current control means is time shared between certain of said control windings, and at a no signal condition the quiescent current in said control windings will be equal and the motor will be idle.

10. In a position servo, a two part control device, an output device, an amplifier and a motor operatively connected between said control device and said output device to amplify a signal from said control device and to drive one part of said control device to positional agreement with the other part of said control device in response to a signal from said one part of said control device, said amplifier including a magnetic amplifier portion having two saturable reactor elements each with a core and having thereon, excitation, control and output windings, a source of excitation connected to said excitation windings, said output windings being connected to said motor, switching means connected to said control windings and having a common terminal, a single impedance current control means electrically connected between said common terminal and a winding of said one part of said control means.

11. In an amplifier having a magnetic amplifier portion including a pair of saturable reactor elements each with a core of magnetizable material having excitation, control and output windings thereon, diode switching means, said control windings being connected in a balanced arrangement with said diode switching means, and current control means connected to an electrical midpoint of said diode switching means, whereby said current control means is time shared between the control winding of each of said saturable reactor elements.

12. An amplifier connectable to a source of excitation including saturable reactor elements with cores of magnetizable material having excitation, control and output windings thereon, diode switching means, said control windings being connected in a balanced arrangement with said diode switching means and having a common terminal, and current control means connected to said common terminal, said current control means being time shared between certain of said control windings.

13. In a position servo, a two part control device, an output device, an amplifier and a motor operatively connected between said control device and said output device to amplify a signal from said control device and to drive one part of said control device to positional agreement with the other part of said control device in response to a signal from said one part of said control device, said amplifier including a magnetic amplifier portion having two saturable reactor elements each with a core and having thereon, excitation, control and output windings, a source of excitation connected to said excitation windings, said output windings being connected to said motor, diode switching means connected to said control windings and having a common terminal, and a single impedance current control means electrically connected between said common terminal and a winding of said one part of said control means.

References Cited in the file of this patent

UNITED STATES PATENTS

| | | |
|---|---|---|
| 2,411,608 | Lesnick | Nov. 26, 1946 |
| 2,679,621 | Houck | May 25, 1954 |